US011074746B2

(12) United States Patent
You et al.

(10) Patent No.: US 11,074,746 B2
(45) Date of Patent: Jul. 27, 2021

(54) SYSTEM AND METHOD OF HIGHLY-SCALABLE MAPPING AND 3D TERRAIN MODELING WITH AERIAL IMAGES

(71) Applicant: Locus Social Inc., Arlington, VA (US)

(72) Inventors: Haowen You, Arlington, VA (US); Shaofeng Yang, Arlington, VA (US)

(73) Assignee: Locus Social Inc., Arlington, VA (US)

( * ) Notice: Subject to any disclaimer, the term of this patent is extended or adjusted under 35 U.S.C. 154(b) by 40 days.

(21) Appl. No.: 16/212,887

(22) Filed: Dec. 7, 2018

(65) Prior Publication Data

US 2019/0180501 A1    Jun. 13, 2019

Related U.S. Application Data

(60) Provisional application No. 62/597,003, filed on Dec. 11, 2017.

(51) Int. Cl.
*G06T 17/05* (2011.01)
*G05D 1/08* (2006.01)
*G05G 5/00* (2006.01)
*G05D 1/00* (2006.01)

(52) U.S. Cl.
CPC ........... *G06T 17/05* (2013.01); *G05D 1/0808* (2013.01)

(58) Field of Classification Search
USPC ............................................................ 701/3
See application file for complete search history.

(56) References Cited

U.S. PATENT DOCUMENTS

| 8,531,472 | B2 * | 9/2013 | Freund | G06T 17/05 345/582 |
| 2009/0087029 | A1 * | 4/2009 | Coleman | G06K 9/00208 382/103 |
| 2011/0295575 | A1 * | 12/2011 | Levine | G06Q 30/02 703/2 |

* cited by examiner

*Primary Examiner* — Tyler D Paige
(74) *Attorney, Agent, or Firm* — Mei & Mark LLP

(57) ABSTRACT

A system and method for generating a 3D model and/or map of a geographic region is disclosed. A computer designates a geographic region and a number of aircraft, and partitions the designated geographic region into sub-regions, creates waypoints within each sub-region, and plans missions for each aircraft to fly to each waypoint and take pictures. The aircraft are configured to accept and perform missions from the computer, and the computer receives images from the aircraft, assigns each image to a sub-region, and transmits each sub-region and images, as well as instructions, to the computing resource. The computing resource executes the instructions, which perform 3D reconstruction and generate orthophotos and 3D models. The 3D reconstruction comprises trimming distorted portions of the orthophotos and 3D models, and merging the orthophotos and 3D models from each sub-region into a 3D model and/or map of the geographic region.

16 Claims, 6 Drawing Sheets

SYSTEM AND METHOD OF HIGHLY-SCALABLE MAPPING AND 3D TERRAIN MODELING WITH AERIAL IMAGES

This application claims the benefit of priority, under 35 U.S.C. § 119(e), to U.S. Provisional Application Ser. No. 62/597,003, filed on Dec. 11, 2017, which is incorporated by reference herein in its entirety.

FIELD OF THE INVENTION

The invention relates generally to methods and apparatus for highly-scalable mapping and 3D terrain modeling with aerial images.

BACKGROUND

Mapping and 3D terrain modeling with aerial images are among the essential components of photogrammetry services, remote-sensing based analytics services, navigation services, and location-based internet services. These services use satellites and aircraft such as airplanes and drones to obtain aerial images of terrain. The mapping market has been controlled by monopolies, using, for example, high cost, satellite and fixed-wing UAV hybrid, data collection methods. Recently, improvements in the affordability, performance, and stability of drones have significantly improved the usefulness of drones for obtaining the images required for mapping and 3D terrain modeling.

There are at least two known limitations when attempting to model a large area (e.g. greater than 10,000 square meters). First, 3D reconstruction can take several hours to finish. 3D reconstruction is a process of capturing the shape and appearance of real objects. This process can be accomplished either by active or passive methods. If the model is allowed to change its shape in time, this is referred to as non-rigid or spatio-temporal reconstruction. The process comprises creating 3D models from a set of images, which involves a series of processing steps. By the stage of Material Application there is complete 3D mesh, to which color from the original photographs may be applied. This can range from projecting the images onto the mesh randomly, through approaches of combining the textures for super resolution and finally to segmenting the mesh by material, such as specular and diffuse properties. 3D reconstruction may generate orthophotos, which are aerial photographs or images geometrically corrected, or orthorectified, such that the scale is uniform: the photo has the same lack of distortion as a map. Second, the flight time of drones is relatively short, resulting in only a portion of the required images taken per flight.

SUMMARY

In accordance with the invention, a system and method for generating a 3D model and/or map of a geographic region, the system comprising a computer comprising a user interface, a data storage medium, and a communication means; a plurality of aircraft each comprising image capture and storage means and a communication means; a computing resource comprising a communication means; wherein the computer is capable of receiving via the user interface a designated geographic region and a designated number of aircraft; wherein the computer is configured to partition the designated geographic region into a plurality of sub-regions; create a plurality of waypoints within each sub-region based on the number of aircraft; and plan and assign missions to each aircraft of the plurality of aircraft; the missions comprising instructions to fly to each waypoint and take pictures; wherein the aircraft are configured to accept and perform missions from the computer; wherein the computer downloads the images from the aircraft, assigning each image to a sub-region; wherein the computer is configured to transmit each sub-region and its images, as well as instructions, to a computing resource; wherein the computing resource is configured to execute the instructions from the computer, wherein the instructions comprise how to perform 3D reconstruction and generate orthophotos and 3D models, wherein the 3D reconstruction comprises building 3D models from multiple aerial images, trimming distorted portions of the 3D models and orthophotos, and merging the 3D models and orthophotos from each sub-region into a 3D model and/or map of the geographic region.

Additional objects and advantages of the invention will be set forth in the description which follows, and will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

In this application, the use of the singular includes the plural unless specifically stated otherwise. It must be noted that, as used in the specification and the appended claims, the singular forms "a," "an" and "the" include plural referents unless the context clearly dictates otherwise. In this application, the use of "or" means "and/or" unless stated otherwise. Furthermore, use of the term "including" as well as other forms, such as "include", "includes," and "included," is not limiting.

The accompanying drawings, which are incorporated in and constitute a part of this specification, illustrate one or more embodiments of the invention and together with the description, serve to explain the principles of the invention.

DETAILED DESCRIPTION

The described invention resolves the problems described in the Background, above, by partitioning the specified mapping area to sub-areas, so that the 3D reconstructions can be executed by multiple computing facilities or multiple CPU cores of a single computing facility, in parallel, and dispatching multiple aircraft capable of taking an image to simultaneously retrieve aerial images for these partitioned areas. An aircraft, as used herein, may be any vehicle capable of traveling through the air at a sufficient height to enable taking pictures of terrain, including but not limited to airplanes, helicopters, tiltrotors, ultralights, airships, gliders, hot air balloons, or drones. The system is capable of receiving and using aerial images from any source, and may program the aircraft directly or may, for example, send human-readable instructions if the aircraft comprises a pilot.

To adopt this partition-based parallel mapping and modeling, the described invention also comprises improved aircraft waypoint scheduling and improved image processing.

The described invention demonstrates significantly better performance than the current approach, as described in the Background, above. Especially, the invention reduces the time required to map and model large areas from multiple hours to less than 10 minutes.

Reference will now be made in detail to the exemplary embodiments of the invention, an examples of which is are illustrated in the accompanying drawings. Wherever possible, the same reference numbers will be used throughout the drawings to refer to the same or like parts.

Figure 1:
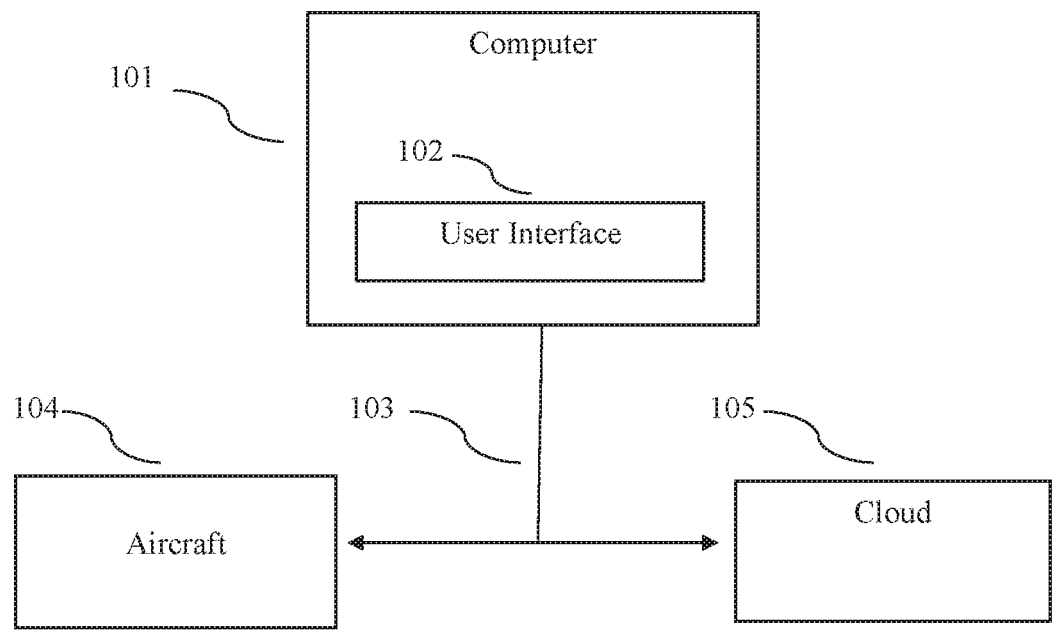
FIG. 1 is a diagram showing system components according to one embodiment of the current invention.

FIG. 1 shows an exemplary system according to one embodiment of the invention. Computer 101, which may be an iPad or other tablet, has a user interface 102 and a means of communicating 103 with both a plurality of aircraft 104 and the Cloud 105. In one embodiment, the aircraft may be programmable drones. In another embodiment, the aircraft are airplanes with programmable autopilot systems. In another embodiment, the aircraft receives human-readable instructions concerning the flightpath and/or waypoints.

Figure 2:
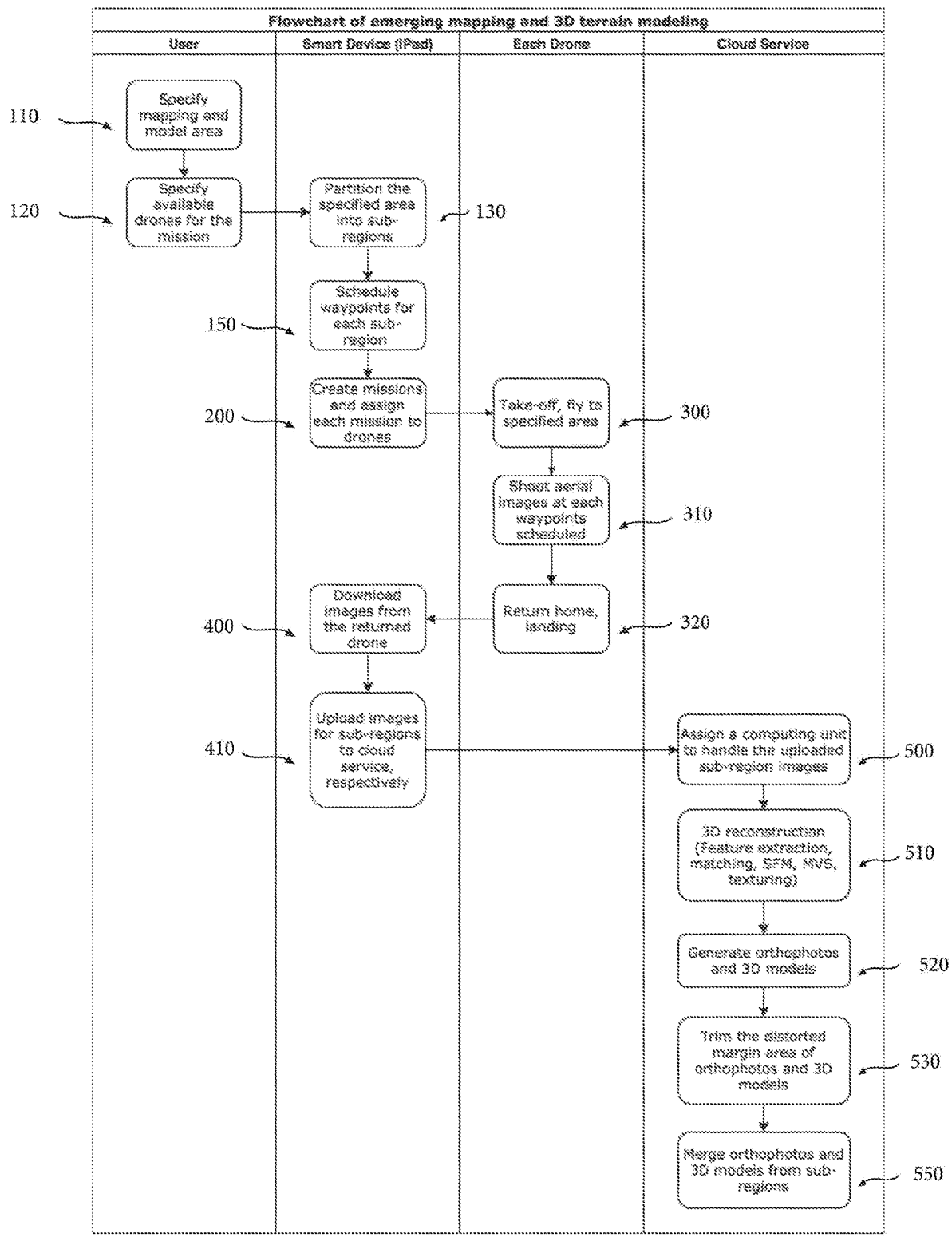
FIG. 2 is a flowchart showing emerging mapping and 3D terrain modeling.

With reference to FIG. 2, in an embodiment, a user first specifies, in step 110, a geographic region to be mapped and modeled, and likewise, in step 120, specifies available aircraft to be assigned to the image-collection missions. A geographic region can be any physical location in the world, possibly associated with a corresponding area on a map or other means of representing the world. In another embodiment, specification of a geographic region in step 110 may be received from another computer or autonomously determined. In another embodiment, step 120 may be automated as a computer may automatically determine how many aircraft are available to be assigned to the image-collection missions.

There are no inherent limitations, such as a minimum or maximum size of the geographic region, or on the shape or contours of the boundary. There is also no inherent maximum number of aircraft that may be used.

The system in step 130 partitions the specified geographic region into a plurality of sub-regions, based at least in part on the number and capabilities of the aircraft available, to optimize the efficiency in obtaining the images. A sub-region is one of a plurality of regions that, when combined, are a geographic region. A single sub-region may comprise a range of 0% to 100% of a geographic region. At least one aircraft would be assigned to each sub-region, although more may be used if available to provide redundancy and/or higher efficiency. The system may take into account other capabilities of the available aircraft, such as flight speed, flight range, and camera resolution.

Figure 3:
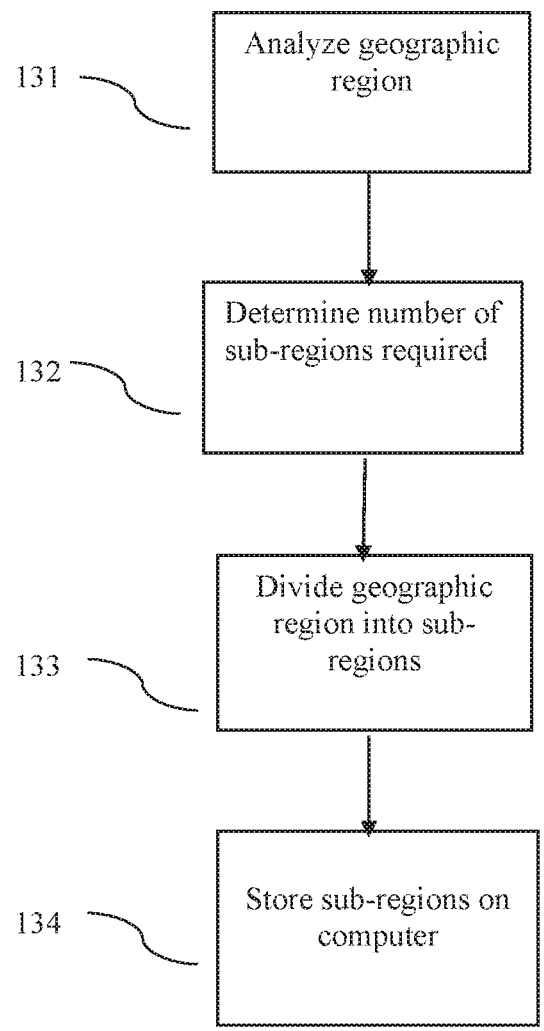
FIG. 3 is a flow chart showing partitioning the geographic region into sub-regions.

FIG. 3 shows more details of step 130. In step 131, the computer analyzes the designated geographic region. In step 132, the computer determines how many sub-regions are required. In step 133, the computer divides the geographic region into sub-regions. In step 134, the computer stores the sub-regions on the computer. In one embodiment, the system arbitrarily splits the region into equally-sized rectangular sub-regions. In another embodiment, the system calculates the area of the designated region and takes into consideration what kind of features exist in the region in determining how to split the region. Features may comprise any scenery or objects, such as buildings, vehicles, paved areas, fields, lakes, etc., and certain features, such as buildings, require more aerial images than other features to produce a high accuracy 3D models and orthophotos.

Referring back to FIG. 2, once the sub-regions are created, the system schedules waypoints for each sub-region, in step 150 of FIG. 2. Waypoints, for the purpose of the application, are points within a sub-region at which the system will schedule an aircraft to take a picture of the surface. The system will create at least enough waypoints, based on the number of aircraft and their capabilities, to ensure that every portion of the sub-region appears in at least one image. Ideally, the system creates sufficient waypoints to provide sufficient overlap between images to ensure that each sub-region is completely photographed. Too many waypoints may slow down the process, however, and waypoints are critical for optimization of the system.

Figure 4:
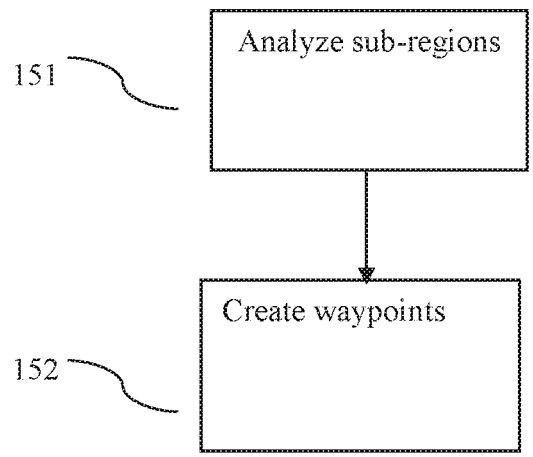
FIG. 4 is a flow chart showing how the system creates waypoints for an exemplary sub-region.

FIG. 4 is a flow chart showing how the system creates waypoints for an exemplary sub-region, as per step 150 in FIG. 2. The system takes the area of each sub-region, the area of an aerial image could cover, and complexity of the scene in this sub-region, as inputs of an algorithm to create waypoints. Thus, the computer analyzes the sub-region as per step 151, ensuring that the route described by the output waypoints is optimal in terms of the distance the aircraft needs to travel; the aerial images taken at adjacent waypoints have sufficient overlap for the 3D reconstruction process to produce a valid 3D model; and that the aerial images taken from all waypoints have enough coverage for the entire sub-region. The system then creates the waypoints based on that analysis in step 152. In another embodiment, additional waypoints are created to account for complex features such as buildings and vehicles.

Again referring back to FIG. 2, once the waypoints are created, the computer creates missions and assigns each mission to an aircraft as per step 200 of FIG. 2. The system may also assign multiple aircraft to a single waypoint if the resources are available. A mission comprises a "flight plan" of waypoints for an aircraft. Ideally, the system will create each mission such that travel between the waypoints is optimized. Optionally, each mission includes returning to base when the mission is concluded, although if communications means or the storage capability of the aircraft is sufficient, the aircraft could be assigned multiple missions or remotely reassigned to another mission. Ideally, the images are automatically transferred; if transferring the images is not successful, the transferring task will be cached and can be triggered either automatically on an event, such as an aircraft landing at the base, or manually by a user.

Each aircraft executes the mission assigned to that aircraft. Each aircraft flies as per step 300 to the waypoints assigned to that aircraft, shooting aerial images at each scheduled waypoint as per step 310. The aircraft may then return to base, as in step 320.

The system then receives the images from the aircraft in step 400. In one embodiment, the images are downloaded after the aircraft have returned to base. In another embodiment, the images could be received from the aircraft at any point after the image is taken, even while in flight, if the aircraft are in communication with the base. If any images are downloaded in route, the system does not re-download those particular images after the aircraft returns. In another embodiment, an aircraft may be immediately assigned to another mission if it has sufficient image storage space (perhaps after having deleted images previously downloaded) and power.

The system assigns each image to a particular sub-region and transmits images from each sub-region to a cloud service and provides instructions for processing by the cloud service, as per step 410. Each sub-region represents a distinct processing unit sent to the cloud service. Thus, the cloud service treats, for the purpose of load-balancing, each sub-region sent as a new, separate job.

Ideally, the cloud service assigns a computing resource to handle the uploaded sub-region images, as per step 500, but a particular sub-region could be assigned to a particular computing resource in the cloud.

The assigned computer resource, using instructions from the computer, performs 3D reconstruction on the images in each sub-region as per step 510; processing the images, and creating the pictures.

Figure 5:
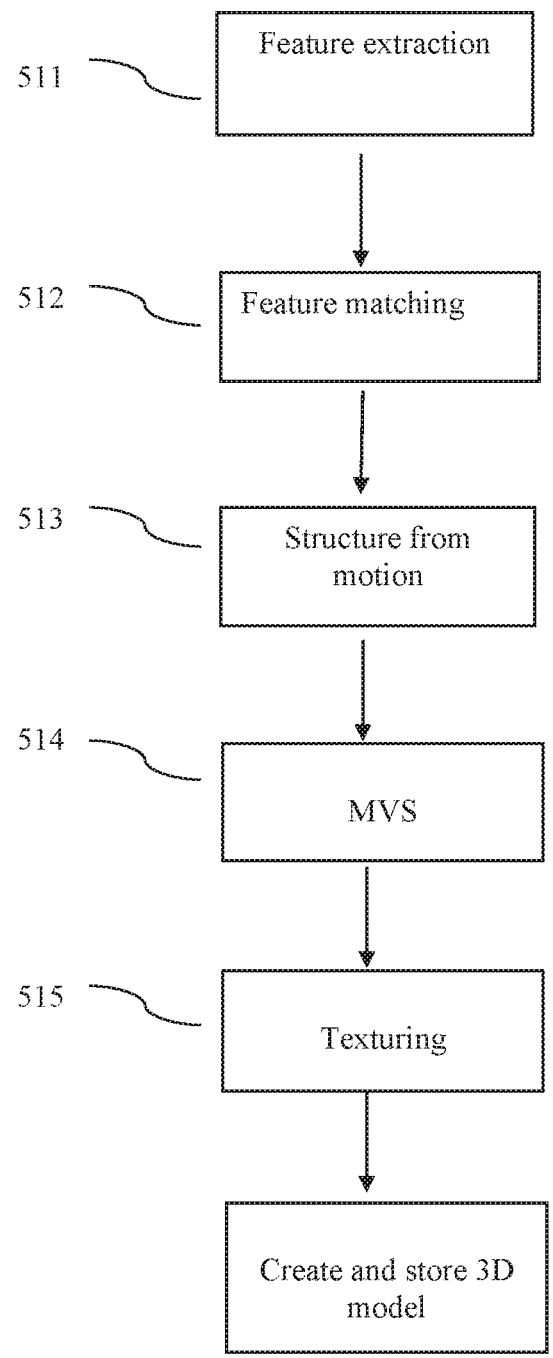
FIG. 5 is a flow chart of 3D reconstruction.

FIG. 5 is a flow chart of an exemplary 3D reconstruction of the images in a sub-region, as in step 510 of FIG. 2. The cloud service, acting on information and instructions provided by the computer, identifies features present in one or more images in step 511 and determines if those features represent the same object so that the object may be used as a point of reference for performing the 3D reconstruction in step 512. For example, the system detects object A in image 1, and object B in image 2, and analyzes each of objects A and B to determine if they are actually the same object. One example of an algorithm for the object matching is structure from motion (SFM), as per step 513; another is MVS, as per step 514. The system performs the matching on projections between aircraft, cameras, points on images, and actual images in the row using coordinate system mapping to combine them into equations to minimize errors. The computer also performs texturing, as per step 515. The process results in a 3D model which is stored, as per step 516.

After the 3D model is created, the assigned computer resource, using instructions from the system, in step 520 of FIG. 2, takes the 3D model and places the orthophotos on the map.

As per step 530 of FIG. 2, the assigned computer resource, using instructions from the system, trims the distorted margin areas of orthophotos and 3D models. The orthophotos created in the previous steps will have edge distortion; that is, some orthophotos/3D models will have stretched or shrunk. The system uses an algorithm to decide what portions of the orthophotos to keep and which do discard. Thus, the lower quality portions of the orthophotos are discarded.

Figure 6:
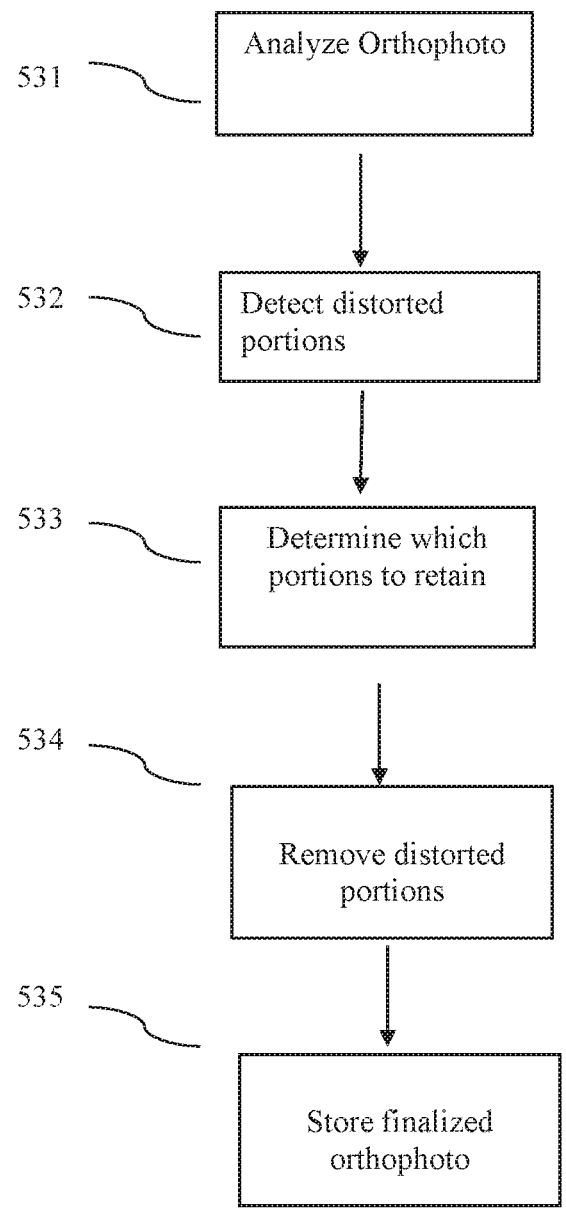
FIG. 6 is a flow chart showing an exemplary means of trimming distorted portions of the orthophotos.

FIG. 6 is a flow chart showing an exemplary means of trimming distorted portions of the orthophotos as in step 530 of FIG. 2. The computing resource in step 531 analyzes an orthophoto. As per step 532, the computing resource detects distorted portions and, as per step 533, determines which portions to keep. The computing resource, in step 534, removes the distorted portions. Finally, the computing resource, in step 535, stores the final orthophoto.

Once the orthophotos are finalized, the assigned computer resource, in step 550 of FIG. 2, using instructions from the system, merges the orthophotos and 3D models from the sub-regions to create a map and 3D model of the region initially specified in step 110. The resulting map and 3D model may be transmitted to, stored on, and displayed on, the computer.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

While the present invention has been disclosed with references to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A system for generating a 3D model of a geographic region, the system comprising:
   a computer comprising a user interface and a data storage medium wherein the computer is configured to communicate with a computing resource and a plurality of aircraft;
   wherein each of the plurality of aircraft are configured to capture and store images, and further configured to receive missions from the computer and transmit the stored images to the computer;
   a computing resource configured to communicate with the computer;
   wherein the computer is capable of receiving via the user interface a designated geographic region and a designated number of available aircraft from the plurality of aircraft;
   wherein the computer is configured to partition the designated geographic region into a plurality of sub-regions; create a plurality of waypoints within each sub-region based on the number of aircraft; and plan and assign missions to each available aircraft; the missions comprising instructions to fly to each waypoint and capture images;
   wherein the computer is configured to download the images captured by the available aircraft, assign each image to the corresponding sub-region, and transmit the images, as well as instructions, to the computing resource;
   wherein the computing resource is configured to execute the instructions from the computer, wherein the instructions comprise performing 3D reconstruction and generating the orthophotos and 3D models of the sub-regions from multiple images received from the computer, trimming distorted portions of the generated orthophotos and 3D models of the sub-regions, and merging the trimmed orthophotos and 3D models to generate a 3D model of the geographic region;
   wherein the computing resource is configured to transmit the 3D model to the computer; and
   wherein the computer is configured to store the 3D model and display the 3D model to the user interface.

2. The system of claim 1, wherein the aircraft is a drone.

3. The system of claim 1, wherein the aircraft is an airplane.

4. The system of claim 1, wherein the computing resource is a cloud-based service.

5. The system of claim 4, wherein the cloud-based service is configured to allow the computer to assign at least one sub-region to a specific cloud-based resource.

6. The system of claim 1, wherein the computer is configured to download the images from the plurality of aircraft prior to the plurality of aircraft completing their respective missions.

7. The system of claim 1, wherein the 3D model is a map of the geographic region.

8. A computer-implemented method for generating a 3D model of a geographic region, the method comprising:
- designating a geographic region and the number of a plurality of aircraft capable of taking images;
- partitioning the geographic region into a plurality of sub-regions;
- creating a plurality of waypoints within each of the plurality of sub-regions;
- creating a plurality of missions and assigning each mission to at least one aircraft;
- retrieving a plurality of images from each of the plurality of aircraft;
- assigning each image to a sub-region;
- performing 3D reconstruction;
- generating orthophotos and 3D models;
- trimming distorted portions of the orthophotos and 3D models;
- merging the orthophotos and 3D models from each sub-region into a 3D model of the geographic region;
- storing the 3D model of the geographic region in a data storage medium; and
- displaying the 3D model of the geographic region on a visual display device.

9. The method of claim 8, wherein the aircraft is a drone.

10. The method of claim 8, wherein the aircraft is an airplane.

11. The method of claim 8, wherein generating orthophotos and 3D models further comprises trimming distortions from the orthophotos.

12. The system of claim 8, wherein the 3D model is a map of the geographic region.

13. A non-transitory computer-readable storage medium encoded with a plurality of computer-executable instructions that, when executed, perform a method comprising the following steps:
- (a) designating a geographic region and a number of aircraft capable of taking images;
- (b) partitioning the geographic region into a plurality of sub-regions;
- (c) creating a plurality of waypoints within each of the plurality of sub-regions;
- (d) creating a plurality of missions and assign each mission to at least one aircraft;
- (e) retrieving a plurality of images from each of the plurality of aircraft;
- (f) assigning each image to a sub-region;
- (g) transmitting images from each sub-region to a computing resource;
- (h) performing 3D reconstruction;
- generating orthophotos and 3D models and trimming distorted portions of the orthophotos and 3D models;
- (j) merging the orthophotos and 3D models from each sub-region into a 3D model of the geographic region;
- (k) storing in a data storage medium, and displaying on a visual display device the 3D model of a geographic region.

14. The system of claim 13, wherein the 3D model is a map of the geographic region.

15. A computer program product for generating a 3D model of a geographic region and including one or more computer readable instructions embedded on a non-transitory, tangible computer readable medium and configured to cause one or more computer processors to perform the steps of:
- (a) designating a geographic region and a number of aircraft capable of taking images;
- (b) partitioning the geographic region into a plurality of sub-regions;
- (c) creating a plurality of waypoints within each of the plurality of sub-regions;
- (d) creating a plurality of missions and assign each mission to at least one aircraft;
- (e) retrieving a plurality of images from each of the plurality of aircraft;
- (f) assigning each image to a sub-region;
- (g) performing 3D reconstruction on images in each sub-region;
- (h) generating orthophotos and 3D models for each sub-region and trimming distorted portions of the orthophotos and 3D models;
- (i) merging the orthophotos and 3D models from each sub-region into a 3D model of the geographic region;
- (j) storing in a data storage medium, and displaying on a visual display device the 3D model of a geographic region.

16. The system of claim 15, wherein the 3D model is a map of the geographic region.

* * * * *